(12) United States Patent
Wang

(10) Patent No.: US 7,329,030 B1
(45) Date of Patent: Feb. 12, 2008

(54) ASSEMBLING STRUCTURE FOR LED ROAD LAMP AND HEAT DISSIPATING MODULE

(75) Inventor: Pei-Choa Wang, Gueishan Township, Taoyuan County (TW)

(73) Assignee: Augux., Ltd., Taoyuan (TW)

( * ) Notice: Subject to any disclaimer, the term of this patent is extended or adjusted under 35 U.S.C. 154(b) by 54 days.

(21) Appl. No.: 11/465,210

(22) Filed: Aug. 17, 2006

(51) Int. Cl.
*F21V 29/00* (2006.01)
*H01L 23/34* (2006.01)

(52) U.S. Cl. ............ 362/373; 362/547; 362/294; 362/311; 257/712; 257/714; 165/104.11

(58) Field of Classification Search ............ 362/373, 362/294, 547, 545, 431, 267, 311; 165/104.24, 165/104.11; 257/712, 714
See application file for complete search history.

(56) References Cited

U.S. PATENT DOCUMENTS

| | | | | |
|---|---|---|---|---|
| 6,132,061 | A * | 10/2000 | Andrus et al. | 362/217 |
| 6,154,362 | A * | 11/2000 | Takahashi et al. | 361/695 |
| 6,517,221 | B1 * | 2/2003 | Xie | 362/373 |
| 7,140,753 | B2 * | 11/2006 | Wang et al. | 362/294 |
| 7,210,832 | B2 * | 5/2007 | Huang | 362/547 |
| 7,284,878 | B2 * | 10/2007 | Dorogi et al. | 362/218 |

FOREIGN PATENT DOCUMENTS

TW  M272940  8/2005

* cited by examiner

*Primary Examiner*—Ali Alavi (57) ABSTRACT

In an assembling structure for LED road lamp and heat dissipating module, the LED road lamp includes a partition board, an upper casing, a light transmitting lens and an LED lamp set. The upper casing and the light transmitting lens are set separately on upper and lower sides of the partition board. Each LED lamp set is contained in a space enclosed by the partition board and the light transmitting lens. The partition board has a plurality of through holes, and the LED lamp set includes a frame body and an LED module. The heat dissipating module includes a heat dissipating body, a heat pipe and an isothermal board. The heat dissipating body is set in a space enclosed by the partition board and the upper casing, and the heat pipe has a heat discharging end passing through and connecting the partition board and the heat dissipating body and a heat receiving end forming the bottom of the partition board. The isothermal board is fixed onto a frame body of the LED lamp and has two planes separately attached onto the heat receiving end and the LED module, so as to significantly enhance the overall heat conducting and dissipating performance, drive an LED to emit light at a lower temperature, and extend the life expectancy of the LED.

10 Claims, 7 Drawing Sheets

ASSEMBLING STRUCTURE FOR LED ROAD LAMP AND HEAT DISSIPATING MODULE

BACKGROUND OF THE INVENTION

1. Field of the Invention

The present invention relates to an assembling structure for LED road lamp and heat dissipating module, and more particularly to an assembling structure capable of improving the heat conduction and dissipation of an LED road lamp significantly.

2. Description of Prior Art

Since light emitting diodes (LEDs) feature the advantages of high brightness, power saving and long life expectancy, LEDs have been used extensively for the illumination of lamps. Several LEDs are usually connected with each other to form an LED module, and a plurality of LED modules are connected in series or in parallel to constitute an LED lamp set to achieve an illumination effect that meets the requirements for a large projecting area and a high brightness and for outdoor illuminations. Since the outdoor illumination devices are exposed to the outside, therefore its requirements for airtightness, water resistance, dust resistance, and heat dissipation are higher than those of the indoor illumination devices. Further, the LEDs come with a low heat resistance, a heat dissipating module is usually required for dissipating the heat produced by each LED, so that each LED can emit lights at a lower temperature, and an LED and a heat dissipating module are indispensable to each other. Therefore, it is an important subject for manufacturers in the related field to design an assembling structure for an LED road lamp and a heat dissipating module.

A prior art LED road lamp heat dissipating structure as disclosed in R.O.C. Pat. No. M272940 includes an upper base, an aluminum partition board, a plurality of LEDs, and a plurality of parallel heat sinks extended upward from the back of the upper base, and one plane of the partition board is attached onto the middle of an internal side of the upper base and another plane is provided for connecting the LEDs, so as to constitute an LED road lamp heat dissipating structure.

However, the prior art LED road lamp heat dissipating structure still has the following problems in its applications. Since the prior art structure simply achieves the heat conduction by attaching each LED with the aluminum partition board and the speed of thermal conduction is very slow, therefore the heat dissipating effect is very limited. Particularly, when high power LEDs are developed continuously, the prior art structure no longer can meet the heat dissipating requirements of the current LED road lamps. Furthermore, the heat conducting and dissipating effects are low, and thus the life expectancy of the LEDs in the prior art structure is shortened greatly, and the prior art requires further improvements.

SUMMARY OF THE INVENTION

In view of the foregoing shortcomings of the prior art, the inventor of the present invention based on years of experience in the related industry to conduct experiments and modifications, and finally designed an assembling structure for an LED road lamp and a heat dissipating module in accordance with the present invention.

Therefore, the present invention is to provide an assembling structure for LED road lamp and heat dissipating module that attaches a heat pipe and an isothermal board with LED modules to quickly dissipate the heat produced by each LED module, and thus greatly improving the heat conducting and dissipating performance and driving the LED to emit light at a lower temperature, so as to extend its life expectancy.

The present invention provides an assembling structure for LED road lamp and heat dissipating module that comprises an LED road lamp and a heat dissipating module. The LED road lamp comprises a partition board, an upper casing covered onto the top of the partition board, a light transmitting lens sealed at the bottom of the partition board and a plurality of LED lamp sets disposed in a containing space enclosed by the partition board and the light transmitting lens. The LED lamp set comprises a frame body and an LED module fixed in the frame body. The heat dissipating module comprises a heat dissipating body, a plurality of heat pipes and a plurality of isothermal boards, and the heat dissipating body is disposed in an airtight space enclosed by the partition board and the upper casing, and the heat pipe has a heat receiving end and a heat discharging end, and the heat discharging end is passed and connected to the partition board and the heat dissipating body, and the heat receiving end forms the bottom of the partition board. The isothermal boards are fixed onto the frame body of the LED lamp set, and two of its planes are attached to a heat receiving end of the heat pipe and the LED module respectively.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. However, the drawings are provided for reference and illustration only and are not intended for limiting the scope of the invention.

Referring to FIGS. 1 to 4 for an exploded view of a portion of the invention, another exploded view of a portion of the invention, a cross-sectional enlarged view of an assembly of the invention, and another cross-sectional enlarged view of an assembly of the invention respectively, an assembling structure for LED road lamp and heat dissipating module in accordance with the present invention comprises an LED road lamp 1 and a heat dissipating module 4.

Figure 1:
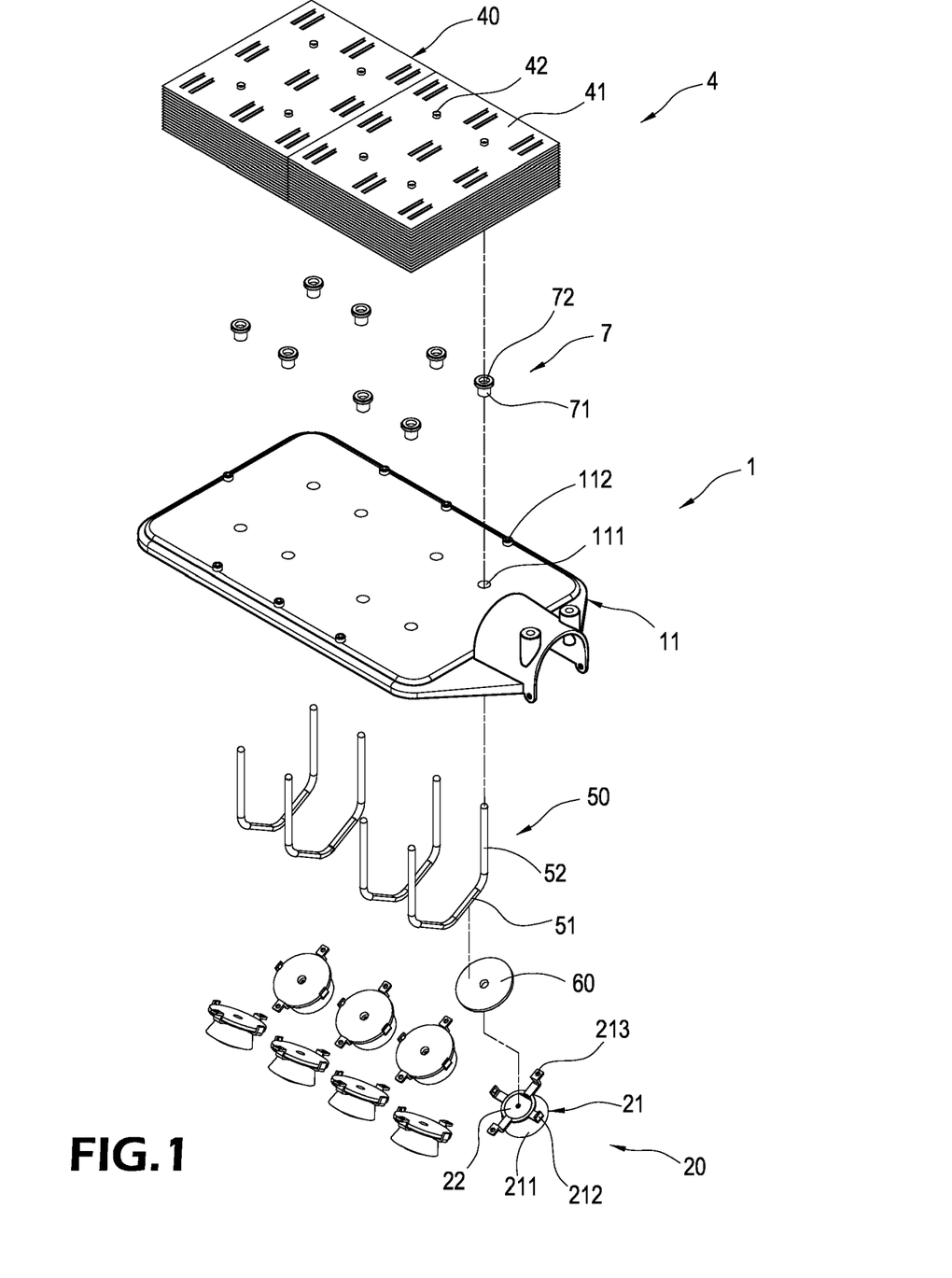
FIG. 1 is an exploded view of a portion of the present invention.
Figure 2:
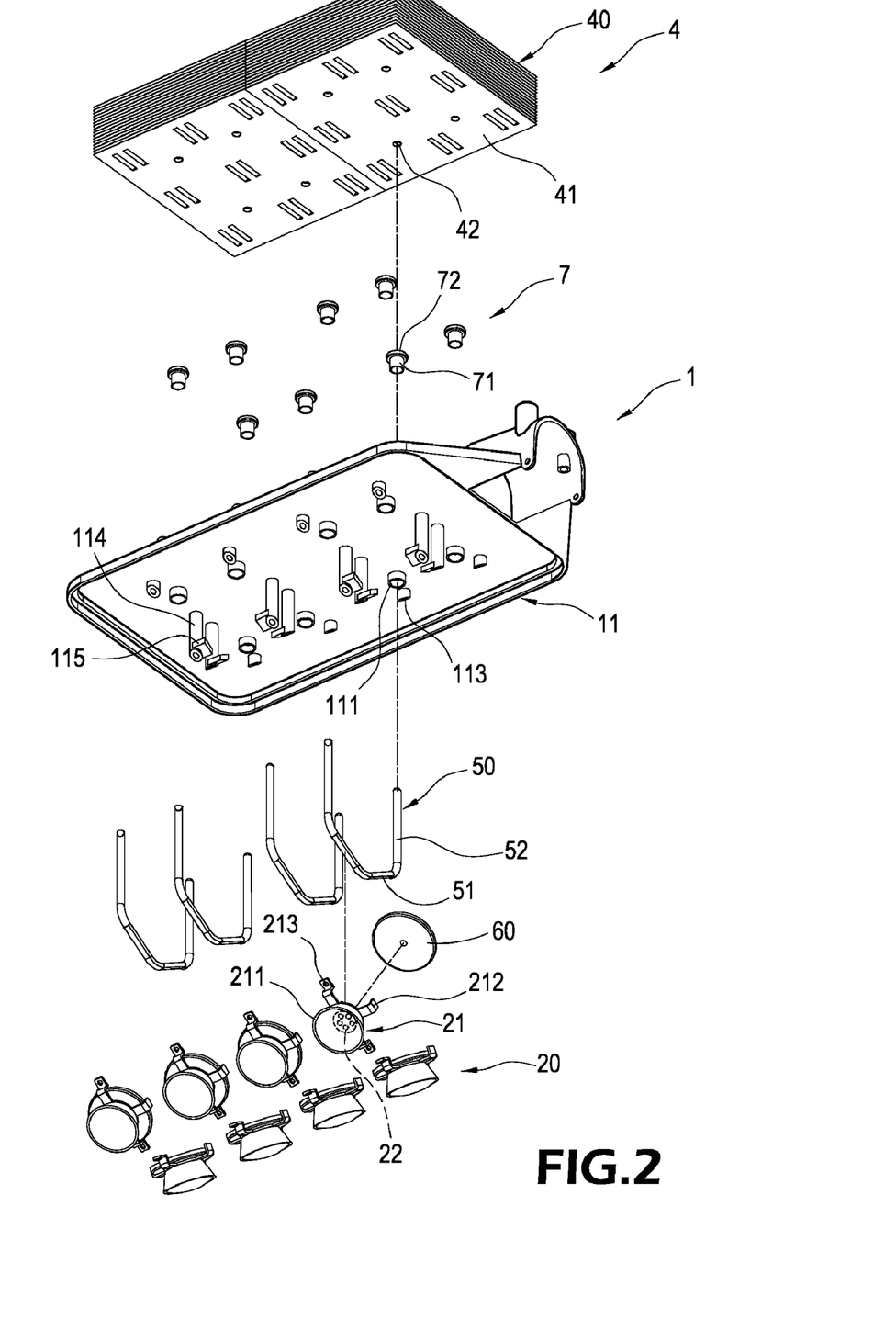
FIG. 2 is another exploded view of a portion of the present invention.
Figure 3:
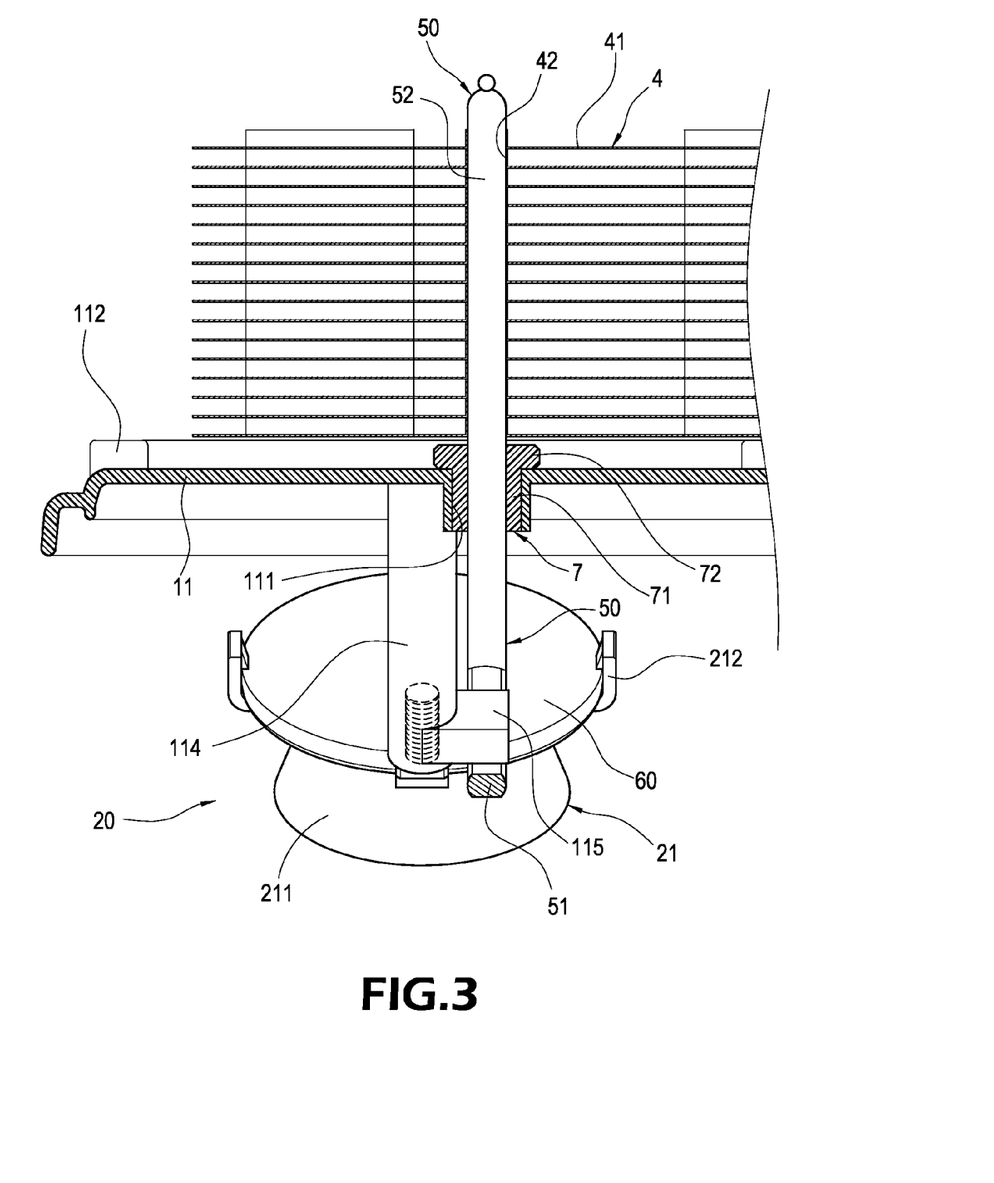
FIG. 3 is a cross-sectional enlarged view of an assembly as depicted in FIG. 2.

The LED road lamp 1 comprises a rectangular partition board 11, an upper casing 12 covered onto the top of the partition board 11 and forming a containing space (also refer to FIG. 5), a light transmitting lens 14 sealed to the bottom of the partition board 11 and a plurality of LED lamp sets 20 contained in an airtight space enclosed by the partition board 11 and the light transmitting lens 14. In this embodiment, a lower frame 13 is sheathed onto the external periphery of the light transmitting lens 14 and then sealed to the bottom of the partition board 11, and the partition board 11 has a plurality of through holes 111 thereon and a plurality of screw pillars 112 protruded upward from the external periphery of the top surface of the partition board 11. Further, the partition board 11 has a short pillar 113 and a long pillar 114 protruded downward from the bottom surface of the partition board 11 and corresponding to the front of each through hole 111, and each long pillar 114 has a stopping member 115 extended from a side of the long pillar 114 (as shown in FIG. 2).

The LED lamp set 20 comprises a frame body 21 and an LED module 22 contained in the frame body 21, and the frame body 21 has a cone 211 and two sets of support stands 212 extended outward from an end of the cone 211, wherein a set of support stands 212 forms a fixing hole 213 at an end of the support stand 211, and the LED module 22 is comprised of a circuit board and a plurality of LEDs and contained inside the top of the cone 211.

Figure 4:
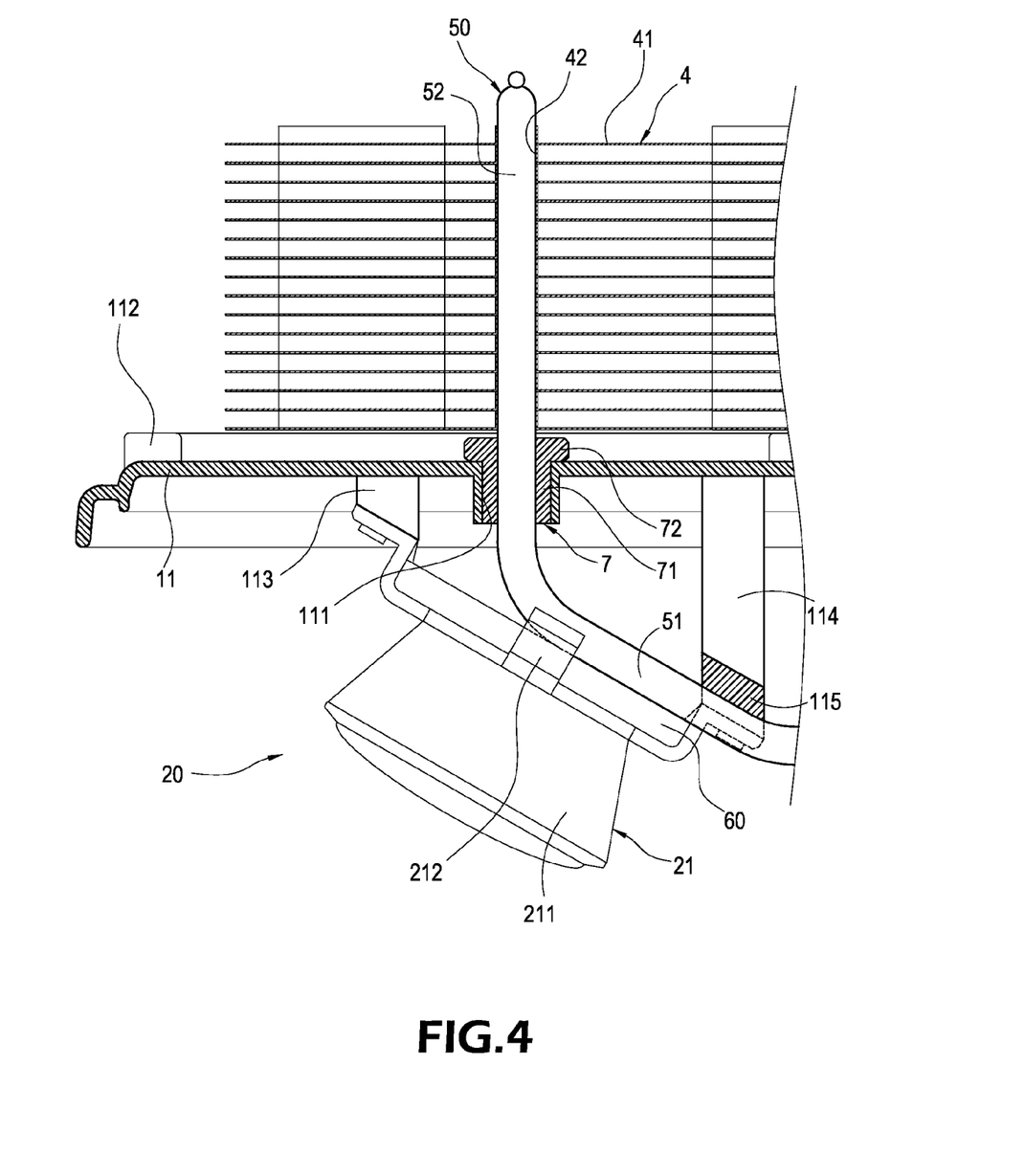
FIG. 4 is another cross-sectional enlarged view of an assembly as depicted in FIG. 2.

The heat dissipating module 4 comprises a heat dissipating body 40, a plurality of heat pipes 50 and a plurality of isothermal boards 60, and the heat dissipating body 40 is formed by stacking a plurality of heat sinks 41 with an interval with each other, and each heat sink 41 has interconnecting holes 42 corresponding to each other, and the heat dissipating body 40 is disposed in a containing space of the partition board 11 and the upper casing 12. The heat pipe 50 has a V-shape heat receiving end 51 and two heat discharging ends 52 erected vertically from an end of the heat receiving end 51, and the heat discharging end 52 is passed through a through hole 111 of the partition board 11 and an interconnecting hole 42 of the heat dissipating body 40, and the heat receiving end 51 is formed at the bottom of the partition board 11. The isothermal boards 60 are fixed onto the internal side of the support stands 212 of the frame body 21, and one of its planes is attached to the heat receiving end 51 of the heat pipe 50 (as shown in FIG. 4) and another plane is attached to each LED module 22 of the LED lamp set 20. The isothermal board 60 includes an upper plate and a lower plate engaged with each other to form a vacuum chamber between the upper and lower plates, and capillary tissues and operating fluids are filled into the chamber, such that a fluid thermal conduction mechanism can be used to achieve a quick thermal conducting effect.

The present invention further comprises a watertight washer 7, and the watertight washer 7 has a cylindrical pillar 71 and a protruding ring 72 expanded outward from a side of the cylindrical pillar 71, and the cylindrical pillar 71 is clamped between the external periphery of the heat pipe 50 and the internal wall of the through hole 111 of the partition board 11, and the bottom surface of the protruding ring 72 is attached onto the top surface of the partition board 11 to prevent the entrance of water moistures and rains.

During installations, each watertight washer 7 is placed into the through hole 111 of the partition board 11 first, and then the heat discharging end 52 of the heat pipe 50 is passed upwardly from the bottom surface of the partition board 11 and through each watertight washer 7, and an interconnecting hole 42 of the heat dissipating body 40 is corresponsive to the heat discharging end 52 of the heat pipe 50, so that the heat dissipating body 40 can be formed at the top of the partition board 11. Now, the internal surface of the heat receiving end 51 of the heat pipe 50 is attached onto the bottom surface of the stopping member 115 of each long pillar 114, such that the frame body 21 of the LED lamp set 20 and the assembly of the isothermal board 60 are installed corresponding to the heat receiving end 51 of the heat pipe 50, and the fixing hole 213 of the frame body 21 corresponds to distal surfaces of the short pillar 113 and long pillar 114 of the partition board 11 and then is fixed by a fixing element such as a screw. The top surface of the isothermal board 60 is in a close contact with the external surface of the heat receiving end 51 to assemble the LED road lamp 1 and the heat dissipating module 4.

Figure 5:
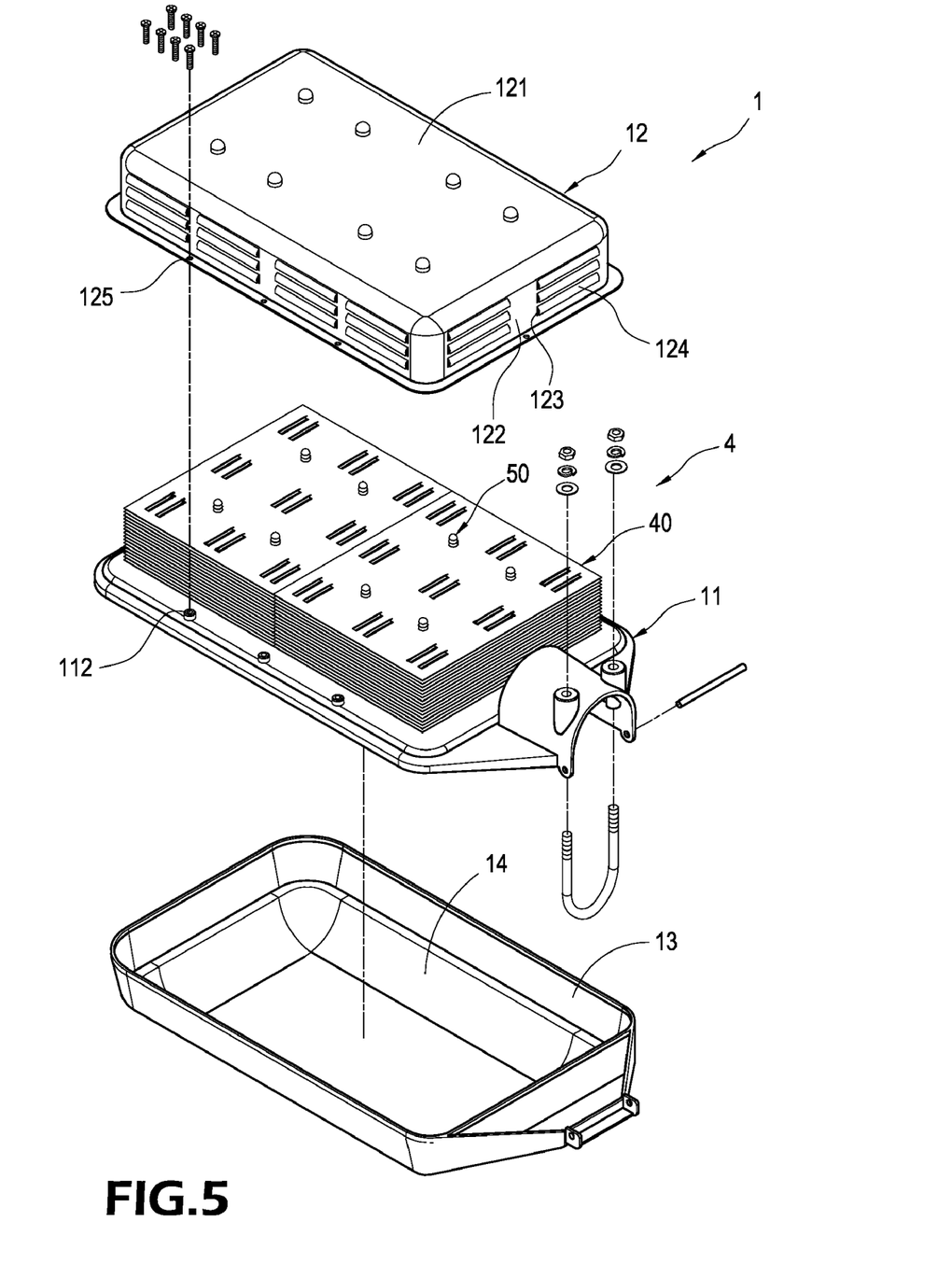
FIG. 5 is an exploded view of an upper casing, a lower chassis, and a light transmitting lens in accordance with the present invention.
Figure 6:
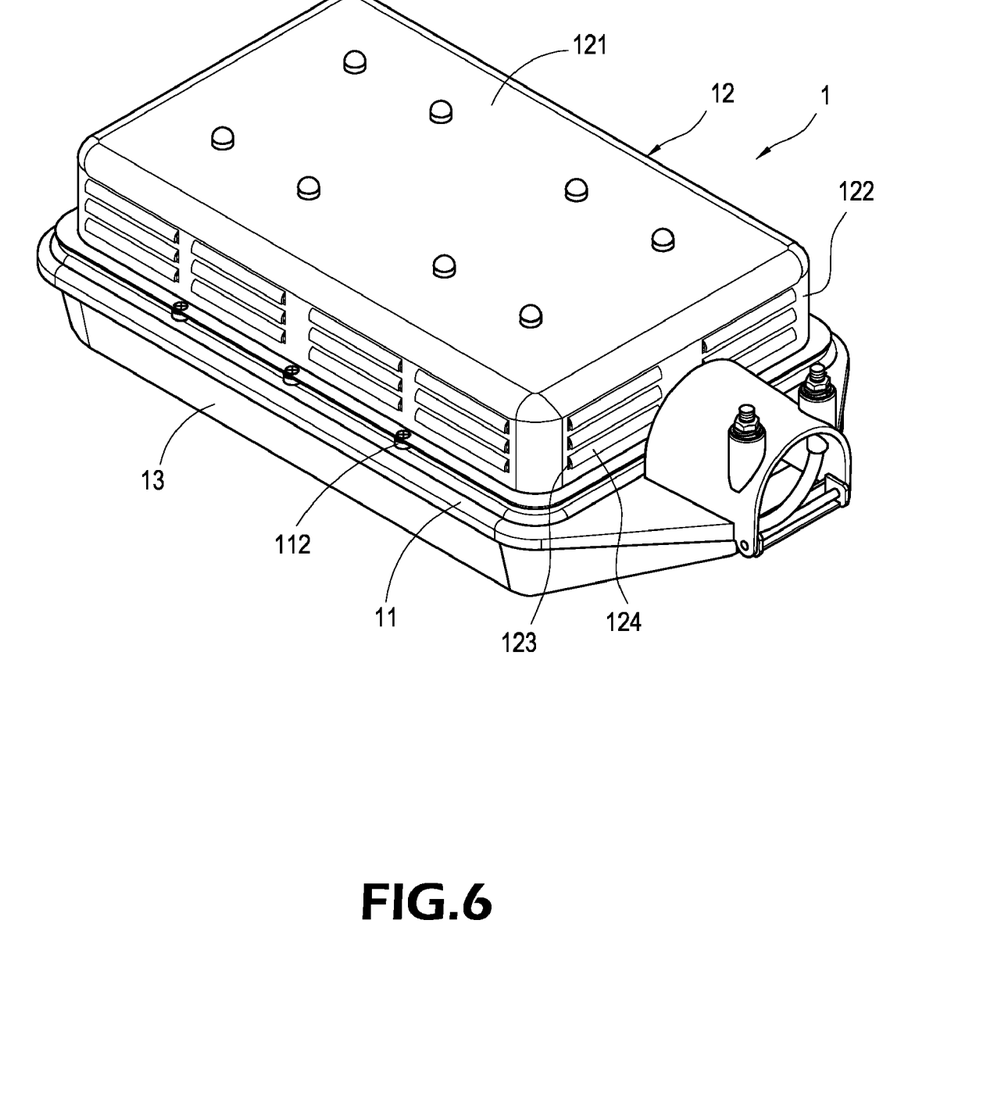
FIG. 6 is a perspective view of an upper casing, a lower chassis, and a light transmitting lens in accordance with the present invention.

Referring to FIGS. 5 and 6 for an exploded view and a perspective view of an upper casing, a lower chassis, and a light transmitting lens in accordance with the present invention respectively, the upper casing 12 is comprised of a rectangular top panel 121 and a plurality of surrounding panels 122 extended downward from the periphery of the top panel 121, and each surrounding panel 122 has a ventilation groove 123 and each ventilation groove 123 forms a cover plate 124 at the top of the ventilation groove 123, and each surrounding panel 122 has a slab extended horizontally from the bottom of the surrounding panel 122, and the slab has a penetrating hole 125 disposed thereon and corresponding to a screw pillar 112 of the partition board 11 for passing a screw to cover the upper casing 12 onto the top of the partition board 11. The lower frame 13 is a rectangular frame body having a containing groove disposed at the middle of the frame body for containing the light transmitting lens 14, and the lower frame 13 and the light transmitting lens 14 are combined with the bottom of the partition board 11 by a pivot and a hook (not shown in the figure).

Figure 7:
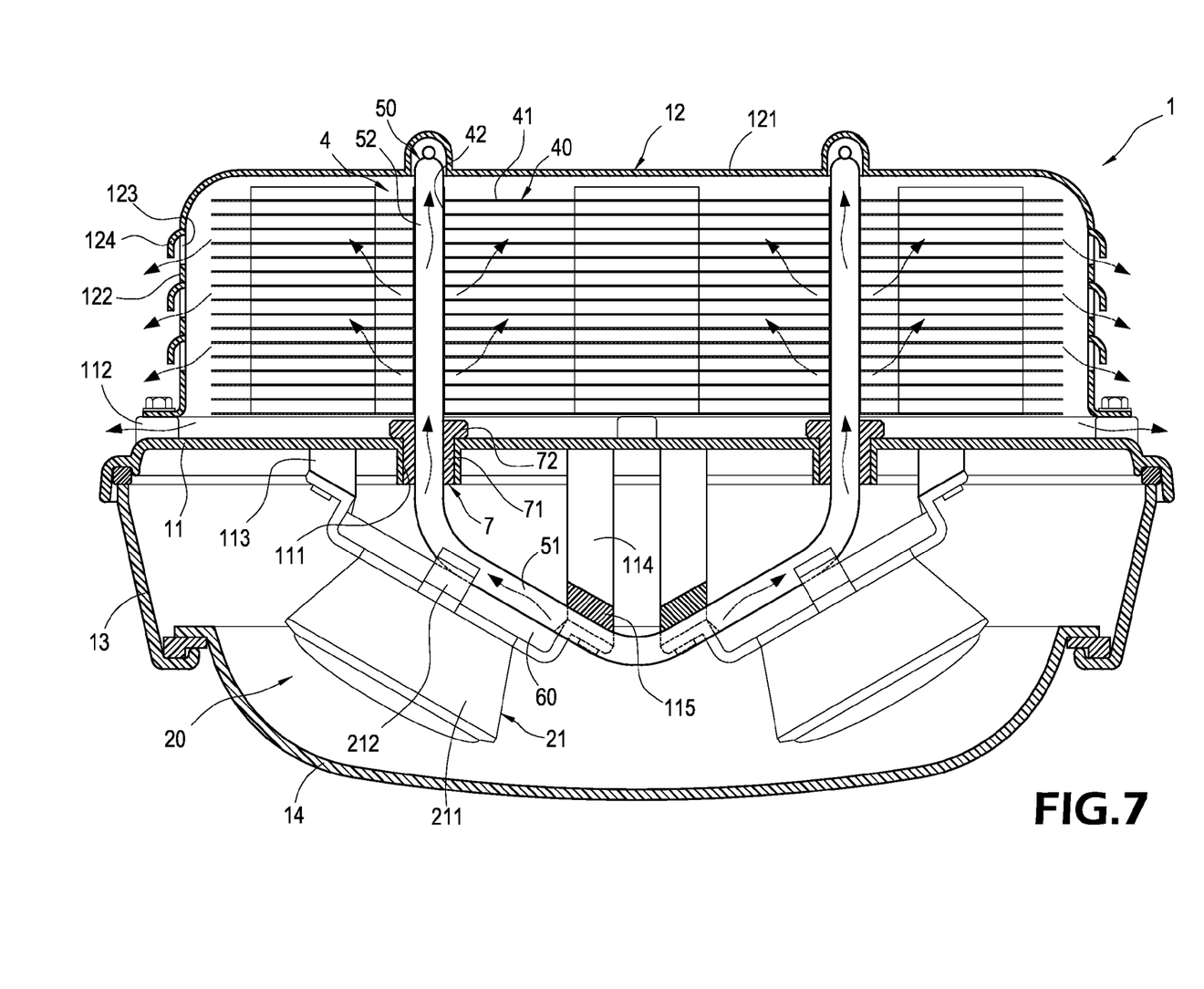
FIG. 7 is a cross-sectional view of an application of the present invention.

Referring to FIG. 7 for a cross-sectional view of an application of the present invention, a current is passed into the LED lamp set 20 during its application, such that the LED of each LED module 22 (as shown in FIG. 2) emits light and produces heat, and the heat is carried to the top of the isothermal board 60 and conducted to a heat receiving end 51 of the heat pipe 51, and guided from the heat receiving end 51 to the heat discharging end 52 by a fluid thermal conduction mechanism of the isothermal board 60. With the heat discharging end 52 attached to the heat dissipating body 40, the heat can be dissipated from each heat sink 41 to the outside, so that the ventilation groove 123 of the upper casing 12 is interconnected to the airflow outside to achieve a convection effect of air. As a result, the heat of each heat sink 41 is dissipated to the exterior of the upper casing 12, and each LED module 22 can emit light at a lower temperature, so as to extend the life expectancy of the LED road lamp.

In summation of the above description, the assembling structure for LED road lamp and heat dissipating module in accordance with the invention herein enhances the performance than the conventional structure and further complies with the patent application requirements.

The present invention are illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An assembling structure for LED road lamp and heat dissipating module, comprising:
   an LED road lamp, comprising:
   a partition board, having a plurality of through holes thereon;
   an upper casing, covered and coupled onto the partition board to define a containing space;
   a light transmitting lens, sealed to the bottom of the partition board to define an airtight space;
   a plurality of LED lamp sets, contained in the airtight space of the partition board and the light transmitting lens, and having a frame body and an LED module fixed in the frame body; and
   a heat dissipating module, comprising:
   a heat dissipating body, disposed in the containing space of the partition board and the upper casing;
   a plurality of heat pipes, each having a heat receiving end and a heat discharging end, and the heat discharging end passing through a through hole of the partition board and the heat dissipating body, and the heat receiving end being formed at the bottom of the partition board;
   a plurality of isothermal boards, each being fixed onto a frame body of the LED lamp set and two planes of the isothermal board being attached to the heat receiving end of the heat pipe and the LED module.

2. The assembling structure for LED road lamp and heat dissipating module of claim 1, wherein the LED road lamp further comprises a lower frame coupled to the external periphery of the light transmitting lens and sealed to the bottom of the partition board.

3. The assembling structure for LED road lamp and heat dissipating module of claim 1, wherein the partition board has a short pillar and a long pillar protruded downward from the bottom surface of the partition board and corresponding to a side of each through hole, and the frame body has a set of support stands, and each support stand forms a fixing hole at its tip for passing and fixing a fixing element onto the short and long pillars.

4. The assembling structure for LED road lamp and heat dissipating module of claim 3, wherein the long pillar has a stopping member extended from a side of the long pillar, and the stopping member is provided for contacting a heat receiving end of the heat pipe.

5. The assembling structure for LED road lamp and heat dissipating module of claim 1, wherein the heat receiving end of the heat pipe is substantially in a V-shape, and the heat discharging end is erected vertically from an end of the heat receiving end.

6. The assembling structure for LED road lamp and heat dissipating module of claim 1, wherein the heat dissipating body is comprised of a plurality of heat sinks stacked with an interval apart from each other, and each heat sink has a corresponding interconnecting hole to be coupled to the heat discharging end of the heat pipe.

7. The assembling structure for LED road lamp and heat dissipating module of claim 1, wherein the upper casing is comprised of a rectangular top panel and a plurality of surrounding panels extended downward from the periphery of the top panel, and each surrounding panel has a ventilation groove, and each ventilation groove forms a cover plate.

8. The assembling structure for LED road lamp and heat dissipating module of claim 7, wherein the surrounding panel has a penetrating hole disposed at the bottom of the surrounding panel, and a screw pillar disposed at the periphery of a top surface of the partition board and corresponding to the penetrating hole for passing a screw to connect and cover the upper casing onto the top of the partition board.

9. The assembling structure for LED road lamp and heat dissipating module of claim 1, further comprising a plurality of watertight washers installed between the external periphery of the heat pipe and the internal wall of the through hole of the partition board.

10. The assembling structure for LED road lamp and heat dissipating module of claim 9, wherein the watertight washer has a cylindrical pillar and a protruding ring expanded outward from a side of the cylindrical pillar, and the cylindrical pillar is disposed between the external periphery of the heat pipe and the internal wall of the protruding ring of the partition board, and the bottom of the protruding ring is attached onto the top surface of the partition board.

* * * * *